United States Patent
Kim et al.

(10) Patent No.: US 9,358,973 B2
(45) Date of Patent: Jun. 7, 2016

(54) APPARATUS AND METHOD FOR CONTROLLING TORQUE REDUCTION OF HYBRID ELECTRIC VEHICLE

(71) Applicant: HYUNDAI MOTOR COMPANY, Seoul (KR)

(72) Inventors: Sang Joon Kim, Seoul (KR); Joonyoung Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/552,152

(22) Filed: Nov. 24, 2014

(65) Prior Publication Data

US 2015/0329100 A1    Nov. 19, 2015

(30) Foreign Application Priority Data

May 15, 2014    (KR) .................. 10-2014-0058568

(51) Int. Cl.
| | |
|---|---|
| *B60L 9/00* | (2006.01) |
| *B60W 20/00* | (2016.01) |
| *B60W 10/06* | (2006.01) |
| *B60W 10/08* | (2006.01) |

(52) U.S. Cl.
CPC .............. *B60W 20/10* (2013.01); *B60W 10/06* (2013.01); *B60W 10/08* (2013.01); *B60W 2520/00* (2013.01); *B60W 2710/0666* (2013.01); *B60W 2710/083* (2013.01); *Y10S 903/93* (2013.01)

(58) Field of Classification Search
CPC ...... B60W 10/06; B60W 10/08; B60W 20/10
See application file for complete search history.

(56) References Cited

U.S. PATENT DOCUMENTS

| | | | | |
|---|---|---|---|---|
| 5,224,044 A * | 6/1993 | Tamura | .................. | B60K 28/16 180/197 |
| 5,265,693 A * | 11/1993 | Rees | .................... | B60K 28/165 180/197 |
| 5,358,317 A * | 10/1994 | Cikanek | .................. | B60L 3/108 303/152 |
| 5,492,192 A * | 2/1996 | Brooks | .................. | B60K 28/16 180/165 |
| 5,564,800 A * | 10/1996 | Fischle | ................... | B60T 8/175 303/140 |
| 5,868,474 A * | 2/1999 | Abe | ....................... | B60K 28/16 180/197 |
| 6,263,267 B1 * | 7/2001 | Anthony | ................ | B60K 6/485 180/65.26 |
| 6,321,144 B1 * | 11/2001 | Crombez | ............ | B60L 15/2009 303/152 |
| 2002/0086773 A1 * | 7/2002 | Hartline | .............. | F16H 61/0213 477/120 |

(Continued)

FOREIGN PATENT DOCUMENTS

| | | |
|---|---|---|
| JP | 2003-047109 A | 2/2003 |
| JP | 2004-222358 A | 8/2004 |

(Continued)

*Primary Examiner* — Calvin Cheung
(74) *Attorney, Agent, or Firm* — McDermott Will & Emery LLP

(57) ABSTRACT

A method for controlling torque reduction of a hybrid electric vehicle including a motor and an engine includes determining whether a demand torque of a traction control system (TCS) is generated. When the demand torque of the TCS is generated, the demand torque of the TCS and a motor output torque is compared. Based on a result of the comparison, torque reduction is performed by using only one of a motor torque. Also disclosed are an apparatus configured to perform the method for controlling torque reduction and a computer readable storage medium causing performance of torque reduction through the use of only one of a motor torque and an engine torque.

16 Claims, 3 Drawing Sheets

(56) References Cited

U.S. PATENT DOCUMENTS

| | | | | |
|---|---|---|---|---|
| 2004/0153234 | A1* | 8/2004 | Mogi | B60K 6/445 701/103 |
| 2005/0060079 | A1* | 3/2005 | Phillips | B60K 5/08 701/53 |
| 2005/0261098 | A1* | 11/2005 | Bowen | B60K 23/0808 475/198 |
| 2009/0024294 | A1* | 1/2009 | Ishida | B60T 8/175 701/87 |
| 2009/0112437 | A1* | 4/2009 | Luehrsen | B60T 8/175 701/84 |
| 2009/0118972 | A1* | 5/2009 | Baur | B60K 6/48 701/102 |
| 2009/0132141 | A1* | 5/2009 | Hrovat | B60K 28/16 701/87 |
| 2009/0145673 | A1* | 6/2009 | Soliman | B60K 6/442 180/65.1 |
| 2009/0255746 | A1* | 10/2009 | Boesch | B60K 6/365 180/197 |
| 2010/0162918 | A1* | 7/2010 | Earleson | B60L 9/02 105/61 |
| 2011/0035130 | A1* | 2/2011 | Noguchi | B60W 10/119 701/89 |
| 2012/0041651 | A1* | 2/2012 | Uematsu | B60K 17/35 701/50 |
| 2012/0130609 | A1* | 5/2012 | Jess | B60W 10/06 701/54 |
| 2012/0265402 | A1* | 10/2012 | Post, II | B60G 17/0165 701/38 |
| 2012/0277943 | A1* | 11/2012 | Kim | B60W 10/06 701/22 |
| 2013/0090829 | A1* | 4/2013 | Oral | B60W 30/18172 701/85 |
| 2013/0261925 | A1* | 10/2013 | Kobayashi | B60K 28/16 701/85 |
| 2015/0065295 | A1* | 3/2015 | An | B60W 10/02 477/5 |
| 2015/0112508 | A1* | 4/2015 | Kato | B60L 15/20 701/1 |
| 2015/0251541 | A1* | 9/2015 | Drako | B60L 3/106 701/22 |
| 2015/0253773 | A1* | 9/2015 | Cox | G05D 1/0083 701/3 |

FOREIGN PATENT DOCUMENTS

| | | |
|---|---|---|
| JP | 3684977 B2 | 8/2005 |
| KR | 10-2010-0056942 A | 5/2010 |
| KR | 10-2012-0064344 A | 6/2012 |
| KR | 10-2012-0122599 A | 11/2012 |
| KR | 10-1221797 B1 | 1/2013 |

\* cited by examiner

APPARATUS AND METHOD FOR CONTROLLING TORQUE REDUCTION OF HYBRID ELECTRIC VEHICLE

CROSS-REFERENCE TO RELATED APPLICATION

This application claims priority to and the benefit of Korean Patent Application No. 10-2014-0058568 filed in the Korean Intellectual Property Office on May 15, 2014, the entire contents of which are incorporated herein by reference.

TECHNICAL FIELD

The present disclosure relates to an apparatus and a method for controlling torque reduction of a hybrid electric vehicle. More particularly, the present disclosure relates to an apparatus and a method for controlling torque reduction of a hybrid electric vehicle that performs torque reduction by using only one of a motor torque and an engine torque according to a demand torque of a traction control system (TCS) when the demand torque of the TCS is generated.

BACKGROUND

Generally, a hybrid electric vehicle is driven by an engine which generates torque from fuel combustion and an electric motor which generates torque from an electric battery.

The hybrid electric vehicle includes a hybrid control unit (HCU) for controlling the operation of other controllers of the hybrid electric vehicle, an engine control unit (ECU) for controlling an operation of an engine, a motor control unit (MCU) for controlling an operation of the driving motor, a transmission control unit (TCU) for controlling an operation of the transmission, and a battery management system (BMS) for managing a condition of a battery.

Meanwhile, a traction control system (TCS) is a safety system for preventing wheel spin and improving driving stability by controlling the brakes and the engine during takeoff or acceleration. The TCS is mounted on the hybrid electric vehicle and requests torque reduction when wheel spin occurs during takeoff or acceleration.

A traditional hybrid electric vehicle performs torque reduction by using the motor only for rapid control when a demand torque of the TCS is generated.

However, the method as above cannot perform torque reduction completely when the demand torque of the TCS is too low or a battery state-of-charge (SOC) is too high. If the demand torque of the TCS is too low, the demand torque of the TCS cannot be satisfied by using the motor only, and if the battery SOC is too high, the motor cannot output sufficient negative torque.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide an apparatus and a method for controlling torque reduction of a hybrid electric vehicle having advantages of performing torque reduction by using only one of a motor torque and an engine torque according to a demand torque of a TCS when the demand torque of the TCS is generated.

An exemplary embodiment of the present inventive concept provides the method for controlling torque reduction of the hybrid electric vehicle including a motor and an engine as a power source that may include determining whether a demand torque of a traction control system (TCS) is generated, when the demand torque of the TCS is generated, comparing the demand torque of the TCS and a motor output torque; and, based on a result of the comparing, performing torque reduction by using only one of a motor torque and an engine torque.

The torque reduction may be performed by simultaneously setting a motor torque command and an engine torque command.

The motor torque command may be set as the demand torque of the TCS and the engine torque command may be set as 0 when the demand torque of the TCS is less than the motor output torque.

The engine torque command may be set to control a net torque output from the engine to be 0.

The motor torque command may be set as the motor output torque and the engine torque command may be set as a value determined by subtracting the motor output torque from the demand torque of the TCS when the demand torque of the TCS is greater than or equal to the motor output torque.

The torque reduction may be performed by using the motor torque only when the demand torque of the TCS is less than the motor output torque.

The torque reduction may be performed by using the engine torque only when the demand torque of the TCS is greater than or equal to the motor output torque.

Another exemplary embodiment of the present inventive concept provides an apparatus for controlling torque reduction of a hybrid electric vehicle. The apparatus may include an engine adapted to be a power source for accelerating a wheel, a motor adapted to be a power source for driving a wheel, a traction control system (TCS) configured to prevent a wheel slip, and a controller configured to control an engine output torque and a motor output torque. The controller may be configured to compare a demand torque of the TCS and the motor output torque and perform torque reduction by using only one of a motor torque and an engine torque based on a result of the comparison.

The controller may be further configured to perform torque reduction by simultaneously executing a motor torque command and an engine torque command.

The controller may be further configured to perform torque reduction by setting the motor torque command as the demand torque of the TCS and the engine torque command as 0 when the demand torque of the TCS is less than the output torque of the motor.

The controller may be further configured to control the engine torque command to set a net torque output from the engine as 0.

The controller may be configured to perform torque reduction by setting the motor torque command as the motor output torque and the engine torque command as a value determined by subtracting the motor output torque from the demand torque of the TCS when the demand torque of the TCS is greater than or equal to the motor output torque.

The controller may be configured to perform torque reduction by using the motor torque only when the demand torque of the TCS is less than the motor output torque.

The controller may be configured to perform torque reduction by using the engine torque only when the demand torque of the TCS is greater than or equal to the motor output torque.

Another embodiment of the present inventive concept provides a computer readable storage medium containing a computer program for a hybrid electric vehicle. The computer program may cause a comparison of a demand torque of a traction control system and a motor output torque, and the performance of torque reduction through the use of one of a motor torque and an engine torque based on a result of the comparison.

As described above, according to an exemplary embodiment of the present inventive concept, a torque of the hybrid electric vehicle can be reduced correctly, so fuel efficiency and driving stability of the hybrid electric vehicle can be improved.

DETAILED DESCRIPTION OF THE EMBODIMENTS

Figure 1:
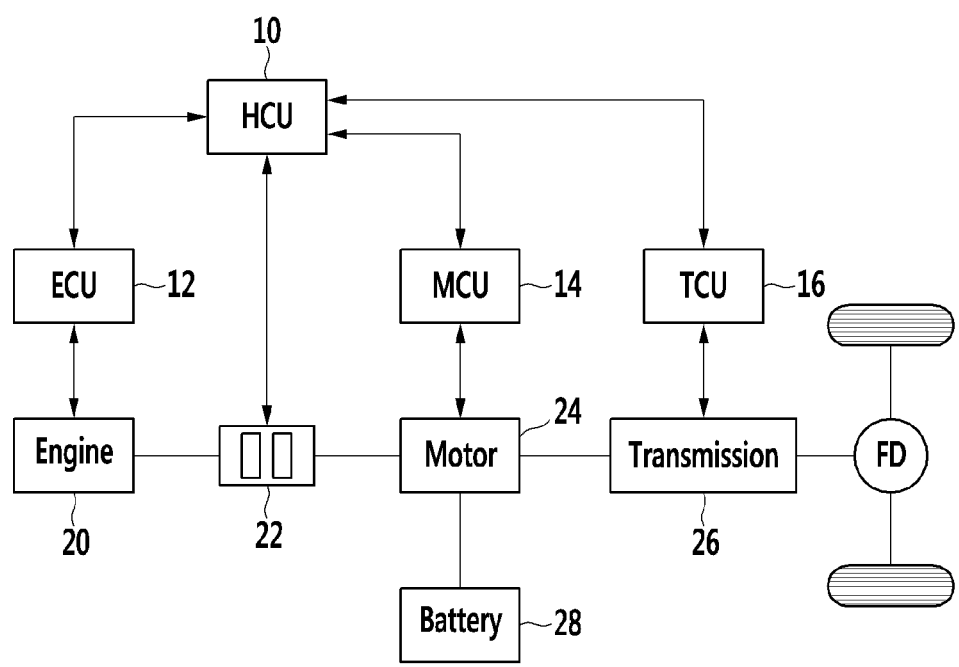
FIG. 1 is a schematic diagram of a hybrid system to which a method for controlling torque reduction of a hybrid electric vehicle is applied according to an exemplary embodiment of the present inventive concept.

In the following detailed description, only certain exemplary embodiments of the present inventive concept have been shown and described, simply by way of illustration. As those skilled in the art would realize, the described embodiments may be modified in various different ways, all without departing from the spirit or scope of the present inventive concept.

Throughout this specification and the claims which follow, unless explicitly described to the contrary, the word "comprise" and variations such as "comprises" or "comprising" will be understood to imply the inclusion of stated elements but not the exclusion of any other elements.

Like reference numerals designate like elements throughout the specification.

It is understood that the term "vehicle" or "vehicular" or other similar term as used herein is inclusive of motor vehicles in general including hybrid vehicles, plug-in hybrid electric vehicles, and other alternative fuel vehicles (e.g., fuels derived from resources other than petroleum). As referred to herein, a hybrid electric vehicle is a vehicle that has two or more sources of power, for example both gasoline-powered and electric-powered vehicles.

Additionally, it is understood that some of the methods may be executed by at least one controller. The term controller refers to a hardware device that includes a memory and a processor configured to execute one or more steps that should be interpreted as its algorithmic structure. The memory is configured to store algorithmic steps and the processor is specifically configured to execute said algorithmic steps to perform one or more processes which are described further below.

Furthermore, the control logic of the present inventive concept may be embodied as non-transitory computer readable media on a computer readable medium containing executable program instructions executed by a processor, a controller, or the like. Examples of computer readable media include, but are not limited to, ROM, RAM, compact disc (CD)-ROMs, magnetic tapes, floppy disks, flash drives, smart cards, and optical data storage devices. The computer readable recording medium can also be distributed in network coupled computer systems so that the computer readable media is stored and executed in a distributed fashion, e.g., by a telematics server or a controller area network (CAN).

An exemplary embodiment of the present inventive concept will hereinafter be described in detail with reference to the accompanying drawings.

FIG. 1 is a schematic diagram of a hybrid system to which a method for controlling torque reduction of a hybrid electric vehicle is applied according to an exemplary embodiment of the present inventive concept.

The hybrid system as shown in FIG. 1 is an exemplary embodiment of the present inventive concept for better comprehension and ease of description. Therefore, a method for controlling engine starting while shifting of a hybrid electric vehicle according to an exemplary embodiment of the present inventive concept may not only be applied to the hybrid system as shown in FIG. 1, but may also be applied to all other hybrid systems.

As shown in FIG. 1, the hybrid system to which a method for controlling torque reduction of a hybrid electric vehicle is applied according to an exemplary embodiment of the present inventive concept includes a hybrid control unit (HCU) 10, an engine control unit (ECU) 12, a motor control unit (MCU) 14, a transmission control unit (TCU) 16, an engine 20, an engine clutch 22, a motor 24, a transmission 26, and a battery 28.

The HCU 10 controls operation of other controllers which mutually exchange information in an entire operation of a hybrid electric vehicle, so that the HCU 10 controls output torque of the engine 20 and the motor 24 by cooperating with the other controllers.

The ECU 12 controls an entire operation of the engine 20 according to conditions of the engine 20, such as a demand torque of a driver, a coolant temperature, and an engine torque.

The MCU 14 controls an entire operation of the motor 24 according to a demand torque of a driver, a driving mode of the hybrid electric vehicle, and an SOC condition of the battery 28.

The TCU 16 controls an entire operation of the transmission 26 such as speed ratios of the transmission 26 depending on output torque of the engine 20 and the motor 24, and an amount of regenerative braking.

The engine 20 outputs power as a power source while turned on.

The engine clutch 22 is disposed between the engine 20 and the motor 24 to receive a control signal of the HCU 10, and selectively connect the engine 20 and the motor 24 according to a driving mode of the hybrid electric vehicle.

The motor 24 is operated by a 3-phase AC voltage applied from the battery 28 through an inverter to generate torque, and operates as a power generator and supplies regenerative energy to the battery 28 in a coast-down mode.

The transmission 26 supplies a sum of an output torque of the engine 20 and an output torque of the motor 24 determined by coupling and releasing of the engine clutch 22 as an input torque and selects any shift gear according to a vehicle speed and a driving condition to output driving force to a driving wheel and maintain driving.

The battery 28 is composed of a plurality of unit cells, and stores a high voltage for supplying a voltage to the motor 24, for example, 400 V or 450 V DC.

The battery 28 supplies a voltage to the motor 24 for supporting power output from the engine 20 in an HEV mode and provides drive force in an EV mode, and is charged by regenerative braking energy.

Figure 2:
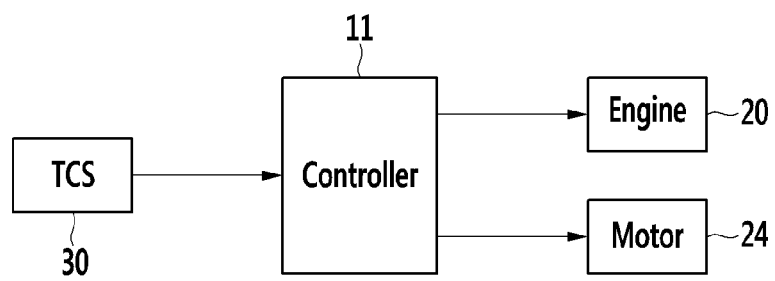
FIG. 2 is a block diagram of an apparatus for controlling torque reduction of a hybrid electric vehicle according to an exemplary embodiment of the present inventive concept.

FIG. 2 is a block diagram of an apparatus for controlling torque reduction of a hybrid electric vehicle according to an exemplary embodiment of the present inventive concept.

The hybrid electric vehicle to which an exemplary embodiment of the present inventive concept is applied includes at least one engine 20 and at least one motor 24. In addition, the hybrid electric vehicle provides a driving mode in which the engine 20 and the motor 24 operate separately or simultaneously as a power source.

As shown in FIG. 2, an apparatus for controlling torque reduction of the hybrid electric vehicle according to an exemplary embodiment of the present inventive concept includes a traction control system (TCS) 30, a controller 11, the engine 20, and the motor 24.

Some processes in the method for controlling torque reduction of the hybrid electric vehicle according to an exemplary embodiment of the present inventive concept to be described below may be performed by the ECU 12, and some other processes may be performed by the HCU 10. Accordingly, for convenience of description, in this specification and claims, many controllers provided in the hybrid electric vehicle such as the ECU 12 and the HCU 10 are called the controller 11.

The TCS 30 is a safety system configured to control a driving torque for preventing a wheel spin when the vehicle starts out or accelerates on a snowy road or a rainy road. Therefore, when the wheel spin occurs because the hybrid electric vehicle starts out or accelerates on a slippery road, the TCS 30 requests torque reduction by outputting an intervention torque.

When the TCS 30 requests torque reduction, the controller 11 compares a demand torque of the TCS 30 and an output torque of the motor 24, and performs torque reduction by using only one of a motor torque and an engine torque based on the comparison result.

Particularly, the controller 11 may control an output torque of the engine 20 by adjusting a fuel injection amount, ignition timing, and a throttle valve in collaboration with the TCS 30, and may control an output torque of the motor 24 by distributing power. Therefore, the controller 11 may perform torque reduction by simultaneously setting an engine torque command which controls the output torque of the engine 20 and a motor torque command which controls the output torque of the motor 24.

The controller 11 may perform torque reduction by setting the motor torque command as the demand torque of the TCS and the engine torque command to 0 when the demand torque of the TCS is less than the output torque of the motor.

If the engine torque is set to 0, an input torque of the engine axis may be controlled to be 0. That is, a torque of more than an engine friction torque is generated in a condition of injecting a fuel into the engine, so a net torque output from the engine 20 is controlled to be 0.

When the demand torque of the TCS is greater than or equal to the motor output torque, the controller 11 may perform torque reduction by setting the motor torque command as the output torque of the motor and the engine torque command as a value determined by subtracting the output torque of the motor from the demand torque of the TCS.

To this end, the controller 11 may be implemented as at least one processor that is operated by a predetermined program, and the predetermined program may be programmed in order to perform each step of a method for controlling torque reduction of the hybrid electric vehicle according to an exemplary embodiment of the present inventive concept.

Hereinafter, a method for controlling torque reduction of the hybrid electric vehicle according to an exemplary embodiment of the present inventive concept will be described in detail with reference to FIG. 3.

Figure 3:
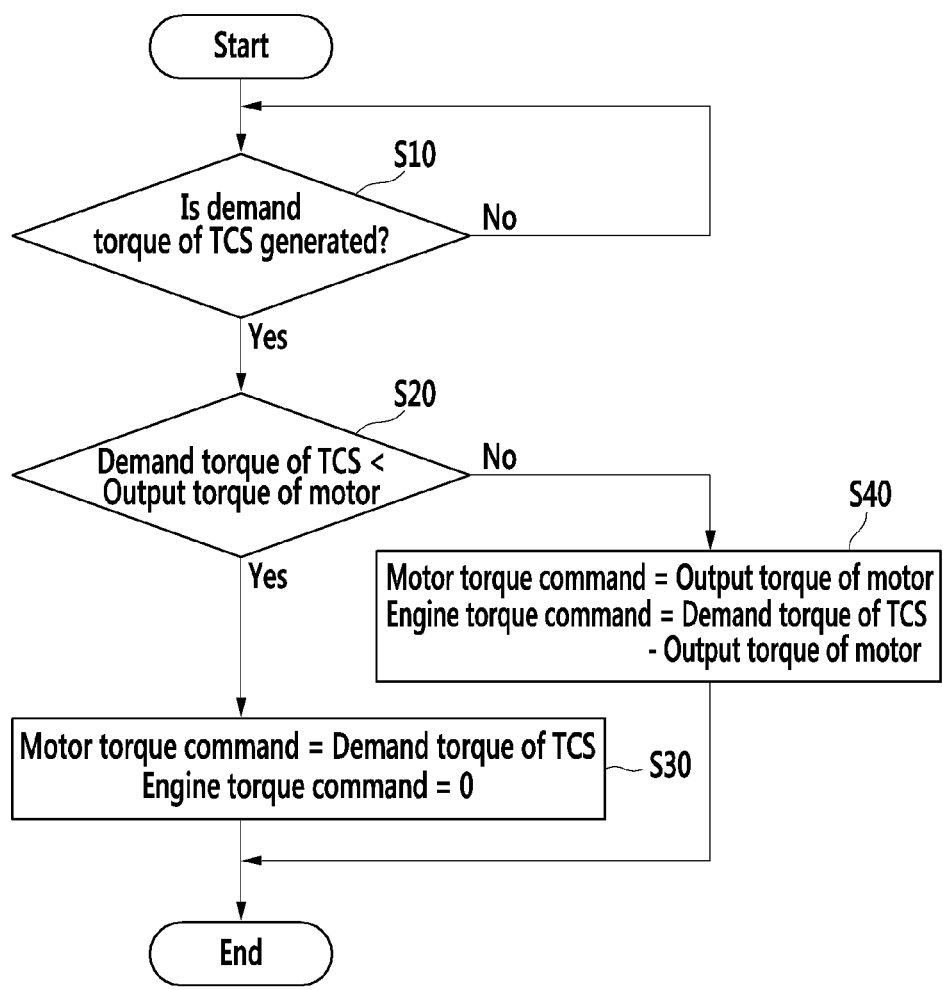
FIG. 3 is a flowchart showing a method for controlling torque reduction of a hybrid electric vehicle according to an exemplary embodiment of the present inventive concept.

FIG. 3 is a flowchart showing a method for controlling torque reduction of the hybrid electric vehicle according to an exemplary embodiment of the present inventive concept.

As shown in FIG. 3, a method for controlling torque reduction of the hybrid electric vehicle according to an exemplary embodiment of the present inventive concept starts with the controller 11 determining whether a demand torque of the TCS 30 is generated at step S10.

When the demand torque of the TCS is generated at the step S10, the controller 11 compares the demand torque of the TCS and an output torque of the motor at step S20.

When the demand torque of the TCS is less than the output torque of the motor at the step S20, the controller 11 determines the motor torque command as the demand torque of the TCS and the engine torque command as 0 at step S30.

Herein, the controller 11 may perform torque reduction by using only a motor torque and by determining the engine torque command as 0.

As described above, if the engine torque is determined as 0, a net torque output from the engine 20 is controlled as 0 in order to offset an engine friction torque. That is, the controller 11 may control the net torque output from the engine 20 as 0 even though a fuel is still injected.

On the contrary, when the demand torque of the TCS is greater than or equal to the output torque of the motor at the step S20, the controller 11 determines the motor torque command as the output torque of the motor and the engine torque command as a value determined by subtracting the output torque of the motor from the demand torque of the TCS at step S40.

Herein, the controller 11 may satisfy the demand torque of the TCS by using only an engine torque and by outputting the output torque of the motor as before.

That is, the controller 11 may perform torque reduction by simultaneously determining a motor torque command and an engine torque command.

As described above, according to an exemplary embodiment of the present inventive concept, a torque of the hybrid electric vehicle can be reduced correctly, so fuel efficiency and driving stability of the hybrid electric vehicle can be improved.

While this inventive concept has been described in connection with what is presently considered to be practical exemplary embodiments, it is to be understood that the inventive concept is not limited to the disclosed embodiments. On the contrary, it is intended to cover various modifications and equivalent arrangements included within the spirit and scope of the appended claims.

What is claimed is:

1. A method for controlling torque reduction of a hybrid electric vehicle including a motor and an engine, the method comprising:
   determining whether a demand torque of a traction control system (TCS) is generated;
   when the demand torque of the TCS is generated, comparing the demand torque of the TCS and a motor output torque; and
   based on a result of the comparing, performing torque reduction by using only one of a motor torque and an engine torque.

2. The method of claim 1, wherein the performing torque reduction comprises simultaneously setting a motor torque command and an engine torque command.

3. The method of claim 2, wherein the motor torque command is set as the demand torque of the TCS and the engine torque command is set as 0 when the demand torque of the TCS is less than the motor output torque.

4. The method of claim 3, wherein the engine torque command is set to control a net torque output from the engine to be 0.

5. The method of claim 2, wherein the motor torque command is set as the motor output torque and the engine torque command is set as a value determined by subtracting the motor output torque from the demand torque of the TCS when the demand torque of the TCS is greater than or equal to the motor output torque.

6. The method of claim 1, wherein the torque reduction is performed by using the motor torque only when the demand torque of the TCS is less than the motor output torque.

7. The method of claim 1, wherein the torque reduction is performed by using the engine torque only when the demand torque of the TCS is greater than or equal to the motor output torque.

8. An apparatus for controlling torque reduction of a hybrid electric vehicle, the apparatus comprising:
 an engine configured to be a power source for accelerating a wheel;
 a motor configured to be a power source for driving a wheel;
 a traction control system (TCS) configured to prevent a wheel slip; and
 a controller configured to control an engine output torque and a motor output torque,
 wherein the controller is configured to:
 execute a comparison of a demand torque of the TCS and the motor output torque; and
 perform torque reduction by using only one of a motor torque and an engine torque based on a result of the comparison.

9. The apparatus of claim 8, wherein the controller is further configured to perform torque reduction by simultaneously executing a motor torque command and an engine torque command.

10. The apparatus of claim 9, wherein the controller is further configured to perform torque reduction by setting the motor torque command as the demand torque of the TCS and the engine torque command as 0 when the demand torque of the TCS is less than the motor output torque.

11. The apparatus of claim 10, wherein the controller is further configured to control the engine torque command to set a net torque output from the engine as 0.

12. The apparatus of claim 9, wherein the controller is configured to perform torque reduction by setting the motor torque command as the motor output torque and the engine torque command as a value determined by subtracting the motor output torque from the demand torque of the TCS when the demand torque of the TCS is greater than or equal to the motor output torque.

13. The apparatus of claim 8, wherein the controller is configured to perform torque reduction by using the motor torque only when the demand torque of the TCS is less than the motor output torque.

14. The apparatus of claim 8, wherein the controller is configured to perform torque reduction by using the engine torque only when the demand torque of the TCS is greater than or equal to the motor output torque.

15. The apparatus of claim 8, wherein the controller is further configured to control the engine output torque by adjusting at least one of a fuel injection amount, an ignition timing, and a throttle valve.

16. A non-transitory computer readable storage medium containing a computer program configured to cause the following to occur in a hybrid electric vehicle when the computer program is read and processed by a computer system:
 comparison of a demand torque of a traction control system and a motor output torque, and
 performance of torque reduction through the use of only one of a motor torque and an engine torque based on a result of the comparison.

* * * * *